United States Patent Office 3,057,109
Patented Oct. 9, 1962

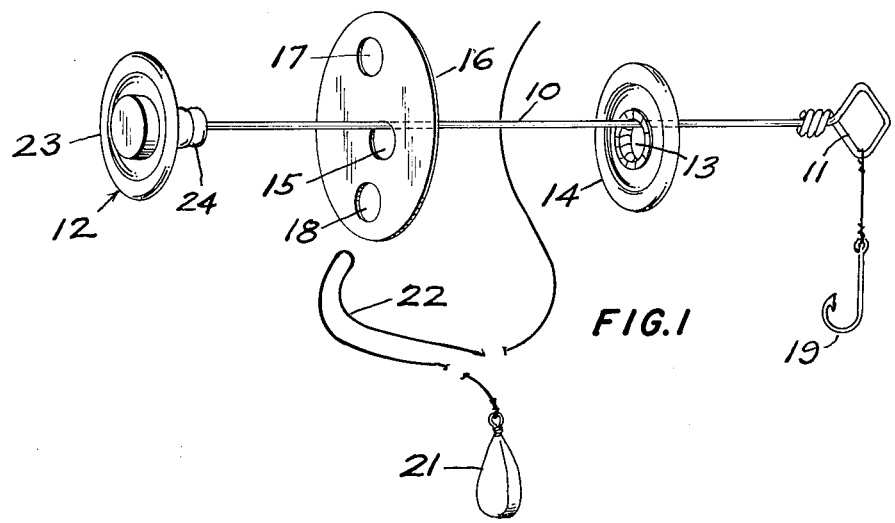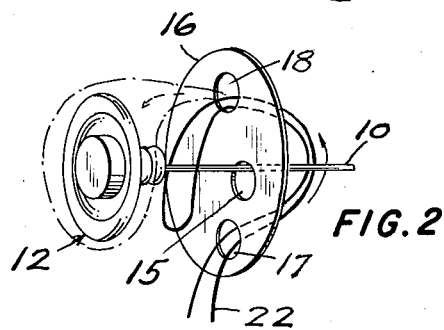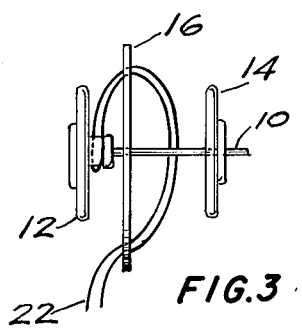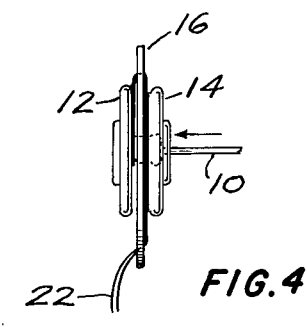
INVENTOR
MACK HOUK though its body is not uniformly circular and the major axis is somewhat longer than the minor axis.

3,057,109
ATTACHMENT FOR FISHING LINES
Mack Houk, 103 S. Van Eps Ave., Sioux Falls, S. Dak.
Filed Aug. 11, 1961, Ser. No. 130,807
5 Claims. (Cl. 43—44.85)

The present invention relates to means for attaching a fishing hook or leader to a fishing line, and more particularly to a snap fastener for gripping a relatively rigid leader to a fishing line without employing knots.

One of the objects of the invention is the provision of a snap fastener having interposed between the parts thereof a novel form of apertured washer designed firmly to grip a fishing line and support a rigid wire leader at an angle to the line.

Another object of the invention is to provide a fastener by means of which a leader may be quickly secured to a fishing line in a manner which eliminates the necessity of knotting the lines together.

A further object of the invention is to provide a firm gripping relation between the parts of the fastener and the fishing line.

Other objects of the invention will be apparent from the following description of a preferred embodiment thereof when taken with the accompanying drawings in which FIG. 1 is a perspective of the fastener and line with the parts thereof separated prior to the attachment of a leader thereto;

FIG. 2 is a fragmentary perspective of some of the parts illustrating the manner in which the line is threaded before the parts of the fastener are snapped into gripping relation with respect to the line;

FIG. 3 is a side view of the fastener and line with the elements separated; and

FIG. 4 is a side view of the fastener with its parts assembled in line gripping relation.

Referring to the drawings, it will be seen that a relatively rigid wire leader 10 is provided at one end thereof with a loop 11 and that the stud component 12 of a separable snap-fastener is soldered or otherwise integrally secured to the opposite end of the wire. The wire passes through the aperture 13 of the socket element 14 of the fastener and an aperture 15 in washer 16. The shape of this washer is substantially oval or egg-shaped, its major axis being larger than the diameter of the snap-fastener. The width of the washer above aperture 15 is somewhat greater than its width below this aperture. The washer is further apertured at 17 in the wider part of the washer and at 18 in the narrower portion of the washer, each of these last-mentioned openings being spaced from the central aperture of the washer a distance greater than the radius of the snap-fastener. A sinker 21 is secured to the end of a flexible fishing line 22 to which the leader 10 is assembled with the snap-fastener and washer in the following manner. The line 22 is first doubled intermediate its ends, after which it is threaded through aperture 17 from that side of the washer nearest the stud element 12 of the fastener. As shown in dotted lines in FIG. 2, it is then threaded through aperture 18 with the loop in the line being passed over the base 23 of the stud element. The line is then drawn taut on the stud head as shown in FIG. 3. Finally, the stud head 24 is inserted through opening 15 in the washer and snapped into socket 13. When so assembled the doubled line is firmly gripped by the fastener and washer, and, since it is looped around wire 10 between the stud and the washer, the leader cannot be accidentally detached.

It will be understood that the wire is secured to the end of the stud head 24 and that the head is of sufficient length to cooperate with the socket member 14 when the washer and doubled line are interposed between the components of the snap-fastener. It is also to be understood that a line having a hook 19 at one end is attached to wire 10 by securing it to loop 11.

Having described the several parts of the line attaching device and the manner in which the elements thereof cooperate to grip the line, it will be appreciated that, when the fishing line is taut, the leader 10 for the hook 19 is caused to assume a position at a right angle to the line which urges the washer to lie in a vertical plane. The eye of the leader is disposed to the fishing line at such a distance that the possibility of entanglement of the hook with the fishing line is minimized, if not entirely obviated. The fastener and line are susceptible of quick assembly, and, when it is desired to remove the line and substitute another therefor, the fastener may be readily separated for insertion of the other line. It is apparent, of course, that two or more grippers with other supplemental lines may be attached to the main fishing lines at spaced distances, one above another.

While a preferred form of the invention has been described and illustrated, it is to be understood that such modifications as come within the definition of the claimed subject-matter are contemplated.

What is claimed is:

1. The combination with a flexible fishing line, a relatively rigid member, a separable fastener for securing said rigid member to said line comprising an apertured socket member, a stud member having a head portion cooperable with said socket member to form a separable resilient connection therewith, and a washer interposed between said socket member and said stud member, said washer being provided with a plurality of apertures, said rigid member passing through said socket member and one of the apertures in said washer, one end of said rigid member being integrally secured to the end of said head portion.

2. The combination as claimed in claim 1 in which the washer is provided with three apertures.

3. The combination as claimed in claim 2 in which the line is doubled to form a loop, said loop being threaded through two of said apertures, the rigid member being passed through the other of said three apertures.

4. The combination as claimed in claim 3 in which the said two apertures are spaced from the other of said apertures a distance greater than the radius of said stud and socket members.

5. The combination as claimed in claim 4 in which the loop is threaded first through one of said two apertures from that side of the washer nearest the stud member, then through the other of said two apertures, and finally over the stud member, said rigid member being disposed within the loop.

References Cited in the file of this patent

UNITED STATES PATENTS

| 2,893,159 | Baird | July 7, 1959 |
| 2,966,001 | Sader | Dec. 27, 1960 |

FOREIGN PATENTS

| 16,185 | Great Britain | Sept. 23, 1891 |
| 23,577 | Great Britain | Oct. 25, 1911 |